Dec. 29, 1959 A. LORENZ Re. 24,759

ARTICLE OF REPOSE FOR SUPPORTING THE BODY OF A PERSON

Original Filed Jan. 11, 1954 2 Sheets-Sheet 1

INVENTOR.
Anton LORENZ

BY J. K. Feiz
Attorney

ARTICLE OF REPOSE FOR SUPPORTING THE BODY OF A PERSON

Original Filed Jan. 11, 1954 2 Sheets-Sheet 2

INVENTOR
ANTON LORENZ
BY
ATTORNEY

United States Patent Office

Re. 24,759
Reissued Dec. 29, 1959

24,759

ARTICLE OF REPOSE FOR SUPPORTING THE BODY OF A PERSON

Anton Lorenz, Boynton Beach, Fla.

Original No. 2,760,554, dated August 28, 1956, Serial No. 403,290, January 11, 1954. Application for reissue August 27, 1958, Serial No. 758,174

12 Claims. (Cl. 155—106)

Matter enclosed in heavy brackets [ ] appears in the original patent but forms no part of this reissue specification; matter printed in italics indicates the additions made by reissue.

This is a continuation-in-part application of my patent application Serial No. 316,197, filed on October 22, 1952, for "An Article of Repose for Supporting the Body of a Person," *now Patent No. 2,760,555,* and of my patent application Ser. No. 316,198 filed on October 22, 1952, for "An Article of Repose for Supporting the Body of a Person," now abandoned.

My invention relates to articles of furniture, and more particularly to reclining chairs or the like articles of furniture, wherein a structure including a seat and a back-rest rigid with each other is rockably mounted on a support.

An object of the present invention is to provide a convenient controlling mechanism for a leg-rest swingably mounted on the seat of a reclining article of furniture of above-described type, by means of which the leg-rest may be propelled forwardly and upwardly at a great initial speed, when the movable members of the article of furniture are swung from their sitting position into a reclined position.

A further object of the invention is to improve on the art of reclining articles of furniture as now customarily made.

Figure 1:
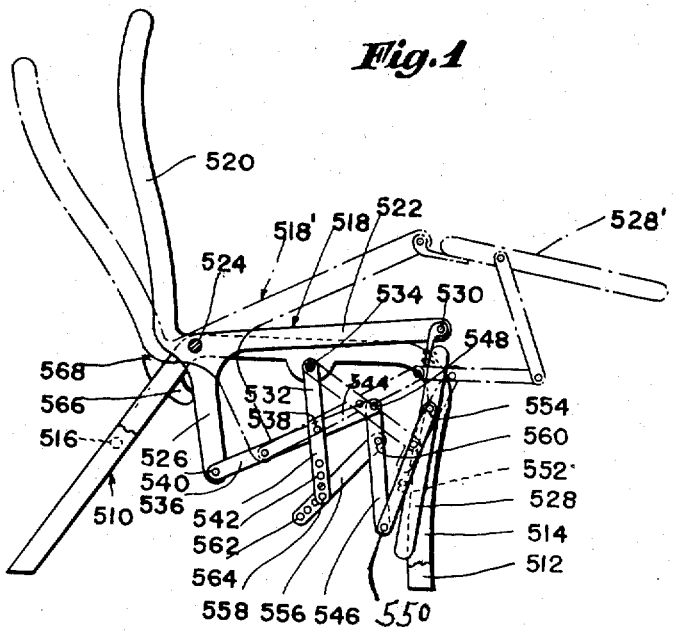
Figure 2:
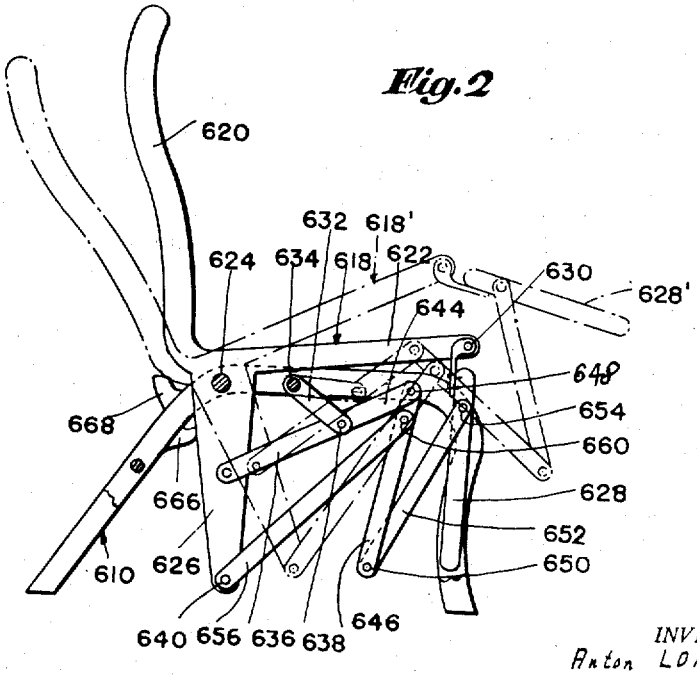
Figure 3:
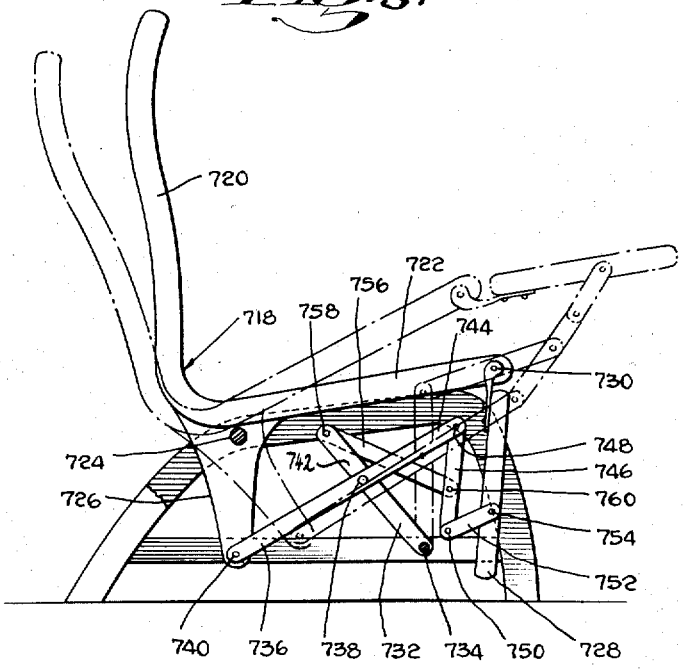

Other objects and structural details will be apparent from the following description when read in conjunction with the accompanying drawings forming part of this specification, wherein:

Fig. 1 is a side elevational view of a chair according to the invention, a portion of a side frame being broken away, Fig. 2 is a side elevational view of another embodiment of a chair according to the invention, a portion of a side frame being broken away, and Fig. 3 is a side elevational view of still another embodiment of a chair according to the invention, a portion of a side frame being broken away.

Referring now to Fig. 1, 510 generally indicates a frame comprising the side frames 512 and 514 connected with each other by a transverse rod 516.

A unit 518 comprising a back-rest 520 and a seat 522 rigid with each other is swingably mounted on the support 510 at 524. Said unit 518 has a downward extension 526 rigid with the former.

A leg-rest 528 is swingably mounted on the front portion of the seat 522 at 530.

The movements of the leg-rest 528 in dependence on the movements of the unit 518 are controlled by the following mechanism:

A first *or guide* link 532 swingably mounted on the support 510 at 534 at a point spaced from the pivotal connection 524 between the unit 518 and the support 510 is pivoted to a second link 536 at 538. The rear end of said second link 536 is pivoted to the downward extension 526 of the unit 518 at 540. The first link 532, the second link 536 and the extension 526 constitute the movable links of a constrained linkage wherein the portion of the support 510 between the pivots 524 and 534 is included as the stationary link.

The first link 532 and the second link 536 have extension 542 and 544 projecting beyond their pivotal connection 538.

One end of a controlling arm 546 is pivoted at 548 to the extension 544 of the second link 536; the other end of said controlling arm 546 is pivoted at 550 to one end of a controlling link 552, the other end of which is pivoted to the leg-rest 528 at 554.

The downward extension 542 of the first link 532 is in pivotal connection with one end of a controlling bar 556 at 558. The other end of said controlling bar 556 is pivoted to the controlling arm 546 at 560.

*It will be seen that the first or guide link 532, second link 536, controlling arm 546 and controlling bar 556 constitute the four elements of a quadric linkage which is based upon the constrained linkage described above. The quadric linkage includes one of the links of the constrained linkage which is pivoted to the stationary support, in this instance the guide link 532 and also the connecting link 536 which is part of the constrained linkage. The leg rest is operatively connected to a portion of the quadric linkage other than the links 532 and 536 (in the example illustrated in Fig. 1 to the controlling arm 546) so as to advance the leg rest when the unit is moved towards a reclining position. By changing the relative lengths of the links of the quadric linkage, the ratio of movements of the leg rest in relation to the support and body-supporting unit may be varied.*

The extension 542 of the first link 532 and the controlling bar 556 are provided with a series of holes 562 and 564, respectively, for an adjustment of the pivotal connection 558.

The sitting position (shown in full lines) of the unit 518 is limited by a stop 566 of the support 510 arranged for cooperation with the extension 526 of the unit. The extreme reclined position (shown in dot and dash lines) of the unit 518 is limited by a stop 568 arranged on the support 510 for cooperation with the back-rest.

When the unit 518 is swung from the sitting position into the extreme reclined position, the leg-rest 528 is propelled forwardly and upwardly into the position 528' by means of the controlling mechanism *532, 536,* 556, 546, 552 described above.

According to the embodiment shown in Fig. 2 again a unit 618 comprising a back-rest 620 and a seat 622 rigid with each other is swingably mounted on the support 610 at 624.

The first link 632 swingably mounted on the support 610 at 634 is pivoted to the second link 636 at 638. The rear end of said second link 636 is pivoted to the downward extension 626 of the unit 618; the forward extension 644 of said second link is pivoted to the upper end of the controlling arm 646 at 648. The lower end of said controlling arm 646 is pivoted at 650 to one end of the controlling link 652, the other end of which is pivoted at 654 to the leg-rest 628 swingably mounted on the seat 622 at 630.

According to said embodiment of Fig. 2 the rear end of the controlling bar 656 is pivoted to the extension 626 of the unit 618 at 640. The other end of said controlling bar 656 is again pivoted to the controlling arm 646 at 660.

*In this construction as in the form of invention shown in Fig. 1, it will be seen that there is a basic four-bar linkage in which the part of the stationary support between the pivots 624 and 634 forms a stationary link and which includes three movable links 626, 632 and 636. Two of these links, 626 and 632, are pivoted at*

*the ends of what may be termed the stationary link 624–634. The link 636 constitutes a connecting link. The lower part of the back rest extension 626 and the connecting link 636 in combination with the controlling arm 646 and the controlling bar 656 constitute the four links of a controlled quadric linkage which in turn produces the movement of the leg-rest.*

Stops 666 and 668 arranged on the support 610 for cooperation with the extension 626 and the back-rest 620 respectively limit the sitting and extreme reclined positions of the unit 618.

When the unit 618 is swung about its pivot 624 into the reclined position 618', the leg-rest 628 is propelled into the position 628' by the controlling mechanism *626, 636,* 656, 646, 652.

According to the embodiment shown in Fig. 3, a unit 718 comprising a back-rest 720 and a seat 722 rigid with each other is rockably mounted on the support 710 at 724.

The lower end of the first link 732 is swingably mounted on the support 710 at 734. Said first link 732 is pivoted at 738 to the second ling 736 pivoted at 740 to the downward extension 726 of the unit 718. The forward extension 744 of said second link 736 is pivoted to the controlling arm 746 at 748. Said controlling arm 746 is pivoted at an intermediate point 760 to one end of the controlling bar 756, the other end of which is pivoted at 758 to the upper extension 742 of the first link 732. The lower end of said controlling arm 746 is pivoted at 750 to one end of a controlling link 752, the other end of which is pivoted at 754 to a leg-rest 728 swingably mounted on the seat 722 at 730.

*The construction shown in Fig. 3, although somewhat different in form from the constructions shown in Figs. 1 and 2, embodies the same essential combination of a four-bar constrained linkage with which is combined a quadric linkage for operating the leg rest. In this instance the four-bar basic linkage includes the downward extension 726 which constitutes a link pivoted at its upper end at point 724 to the stationary support. The link 732 is the second movable link of the constrained linkage, this being pivoted, in this instance, at its lower end, to the stationary support. The third movable link of the constrained linkage is the link 736. The stationary link of the constrained linkage is that part of the stationary support between, or which rigidly carries the pivot points 724 and 734. The quadric linkage comprises the link 732 (including the extension 742 thereof), this being a link pivoted to the stationary support. The second member of the quadric linkage which is also a part of the four-bar constrained likage is the link 736. The other two members of the quadric linkage are the controlling arm 746 and the controlling bar 756.*

The sitting and extreme reclined position are limited by stops 766 and 768 respectively.

When the unit 718 is swung about its pivot 724, the leg-rest 728 is propelled forwardly and upwardly through the linkage described above.

I have described preferred embodiments of my invention, but it is understood that this disclosure is for the purpose of illustration and that various changes in shape and proportion, as well as the substitution of equivalent elements for those herein shown and described may be made without departing from the spirit and scope of the invention as set forth in the appended claims.

Each of the embodiments shown in the drawings may be equipped with locking means for holding the movable members of the chair in any desired position.

What I claim is:

1. An article of repose for supporting the body of a person, comprising in combination: a support, a unit including a seat and a back-rest rigid with each other, said unit being swingably mounted on said support, a downward extension included in the structure of said unit, a first link swingably mounted on said support at a point spaced from the pivotal connection between the support and said unit, a second link pivoted to said downward extension and to said first link for effecting movements of said first link about its pivot in dependence on movements of said unit, said first link, said second link and said downward extension forming the movable links of a constrained linkage including the portion of the support between the pivots of the unit and of the first link as a stationary link, a leg-rest swingably mounted on the front portion of said seat, a controlling arm pivoted to the structure of said second link at one of its end portions, a controlling bar pivoted at one of its end portions to one of the movable links of said linkage which is joined to said second link, said controlling bar being pivoted at its other end portion to said controlling arm, and means interposed between said controlling arm and said leg-rest for effecting movement of the latter in coordination with said controlling arm.

2. In an article of repose as claimed in claim 1, the structure of said second link including an extension projecting beyond its pivotal connection with said first link and said controlling arm being pivoted to said extension of the second link.

3. In an article of repose as claimed in claim 1, said means interposed between said controlling arm and said leg-rest including a controlling link pivoted at one of its end portions to said controlling arm and at its other end portion to said leg-rest.

4. In an article of repose as claimed in claim 1, said controlling bar being pivoted to the structure of said first link.

5. In an article of repose as claimed in claim 1, the structure of said first link including an extension projecting beyond its pivotal connection with the second link, and said controlling bar being pivoted to said extension of the first link.

6. In an article of repose as claimed in claim 1, the structure of said first link including an extension projecting beyond its pivotal connection with the second link, said controlling bar being pivoted to said extension of the first link, and said means interposed between said controlling arm and said leg-rest including a controlling link pivoted at one of its end portions to said controlling arm and at its other end portion to said leg-rest.

7. In an article of repose as claimed in claim 1, said controlling bar being pivoted to said extension of the unit.

8. In an article of repose as claimed in claim 1, said controlling bar being pivoted to said extension of the unit, and said means interposed between said controlling arm and said leg-rest including a controlling link pivoted at one of its end portions to said controlling arm and at its other end portion to said leg-rest.

*9. An article of repose for supperting the body of a person, comprising in combination: a support, a unit including a seat and a back-rest rigid with each other, said unit being swingably mounted on said support, a downward extension included in the structure of said unit, a first link swingably mounted on said support at a point spaced from the pivotal connection between the support and said unit, a second link pivoted to said downward extension and to said first link for effecting movements of said first link about its pivot in dependence on movements of said unit, said first link, said second link and said downward extension forming the movable links of a constrained linkage which includes the portion of the support between the pivots of the unit and the first link as a stationary link, a leg rest swingably mounted on a movable element of the structure, a controlling arm pivoted to the structure of the second link, a controlling bar pivoted at one of its end portions to one of the links of said constrained linkage which is pivoted to the stationary support, said controlling bar being pivoted at another portion thereof to said controlling arm, said link of said*

*constrained linkage to which the controlling bar is pivoted, said second link to which said controlling arm is pivoted, said controlling bar, and said controlling arm, constituting a quadric linkage, and means for operatively connecting said leg rest to a portion of said quadric linkage other than the links of said quadric linkage which are included within said constrained linkage, for effecting movements of the leg rest in coordination with the movements of the seating unit.*

*10. An article of repose for supporting the body of a person, comprising in combination: a support, a unit including a seat and a back-rest rigid with each other, said unit being swingably mounted on said support, two links pivotally mounted at spaced points on said support, an operative connection from said seat and back rest unit to one of said links, a connecting link pivoted at spaced points of its length to said respective links at points on said links spaced from the points at which said links are pivoted to the stationary support, the portion of said stationary support between the pivotal points of said two links, said two links pivoted thereto, and said connecting link forming a constrained linkage, the movements of which are controlled through said operative connection from the seat and back rest unit, a leg rest swingably mounted on a movable portion of the structure of the article of repose, a controlling arm and a controlling bar pivoted to each other, one of said controlling members being pivoted to one of the links of the constrained linkage pivoted to the stationary support, the other of said*

*controlling members being pivoted to said connecting link, and an operative connection from one of said controlling members to the leg rest, said link pivoted to the stationary support, said connecting link, said controlling arm and said controlling bar constituting a quadric linkage through which movement of the leg rest is effected when the seat and back rest unit are moved.*

*11. An article of repose as claimed in claim 10 in which the structure of said first link includes an extension projecting beyond its pivotal connection with the second link, said controlling bar being pivoted to said extension.*

*12. An article of repose as claimed in claim 10 in which the leg rest is pivotally attached to the front part of the seat for movement about an axis spaced from the point of connection at which the operative connection from a controlling member is made to the leg rest.*

References Cited in the file of this patent or the original patent

UNITED STATES PATENTS

| | | |
|---|---|---|
| 1,688,576 | Doyle | Oct. 23, 1928 |
| 2,472,854 | Lorenz | June 14, 1949 |
| 2,579,502 | Lorenz | Dec. 25, 1951 |
| 2,672,919 | Luckhardt | Mar. 23, 1954 |

FOREIGN PATENTS

| | | |
|---|---|---|
| 17,662 | Great Britain | Oct. 5, 1900 |
| 136,657 | Austria | Feb. 26, 1934 |
| 220,033 | Germany | Mar. 14, 1910 |